(12) United States Patent
Yokoyama et al.

(10) Patent No.: US 6,950,465 B1
(45) Date of Patent: Sep. 27, 2005

(54) VIDEO CODING BY ADAPTIVELY CONTROLLING THE INTERVAL BETWEEN SUCCESSIVE PREDICTIVE-CODED FRAMES ACCORDING TO MAGNITUDE OF MOTION

(75) Inventors: Yutaka Yokoyama, Tokyo (JP); Yasushi Ooi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/574,411

(22) Filed: May 18, 2000

(30) Foreign Application Priority Data

May 18, 1999 (JP) .................................. 11-137889

(51) Int. Cl.⁷ .......................... H04N 7/12; H04N 11/02
(52) U.S. Cl. ............................. 375/240.12; 375/240.02
(58) Field of Search ............................... 348/699, 416, 348/407, 409, 700; 382/232, 236, 238; 375/240.04, 375/240.11, 240.14, 240.15, 240.05, 240.07

(56) References Cited

U.S. PATENT DOCUMENTS

| | | | | |
|---|---|---|---|---|
| 5,371,539 A | * | 12/1994 | Okino et al. ............. | 348/208.6 |
| 5,565,920 A | * | 10/1996 | Lee et al. ............... | 375/240.11 |
| 5,682,204 A | * | 10/1997 | Uz et al. ............... | 375/240.15 |
| 5,883,672 A | * | 3/1999 | Suzuki et al. .......... | 375/240.04 |
| 6,091,460 A | * | 7/2000 | Hatano et al. ............... | 348/699 |
| 6,473,459 B1 | * | 10/2002 | Sugano et al. ......... | 375/240.16 |

FOREIGN PATENT DOCUMENTS

| | | |
|---|---|---|
| JP | 6-165103 | 6/1994 |
| JP | 8-46969 | 2/1996 |
| JP | 9-509024 | 9/1997 |
| JP | 9-294266 | 11/1997 |
| JP | 10-304374 | 11/1998 |

* cited by examiner

Primary Examiner—Chris Kelley
Assistant Examiner—Erick Rekstad
(74) Attorney, Agent, or Firm—Scully Scott Murphy & Presser

(57) ABSTRACT

In a video coding apparatus, coding/decoding circuitry provides motion-compensated inter-frame prediction coding on input frames by using reference frames so that the input frames are coded into an intra-frame coded picture, a predictive coded picture or a bi-directionally predictive coded picture and decoding the coded frames to produce reference frames. Decision circuitry determines the magnitude of motion of the input frames relative to the reference frames, determines the interval between successive frames of the predictive coded picture according to the determined magnitude of motion and reorders the input frames according to the determined interval.

13 Claims, 8 Drawing Sheets

FIG. 1A  M = 1
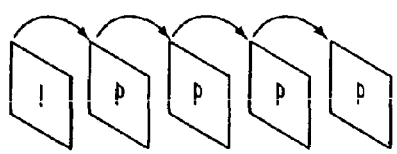
FIG. 1B  M = 2
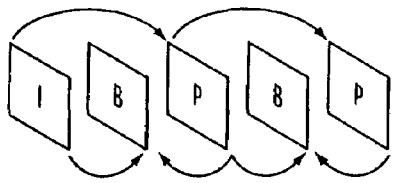
FIG. 1C  M = 3
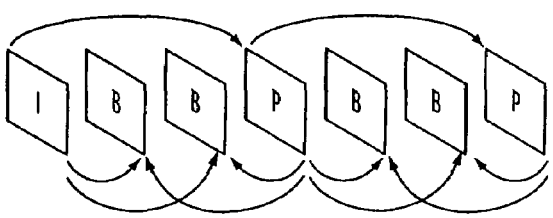
FIG. 2
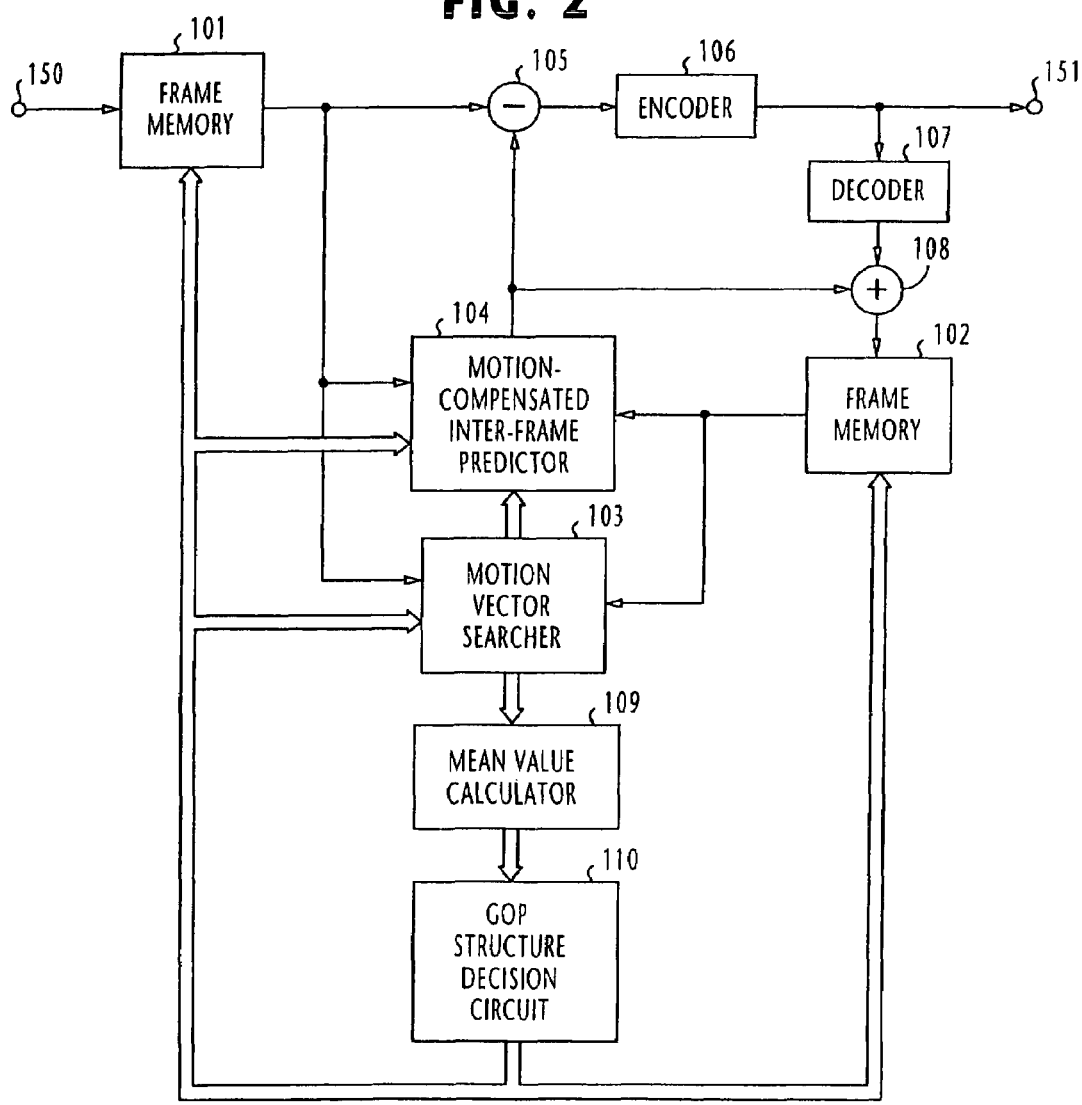

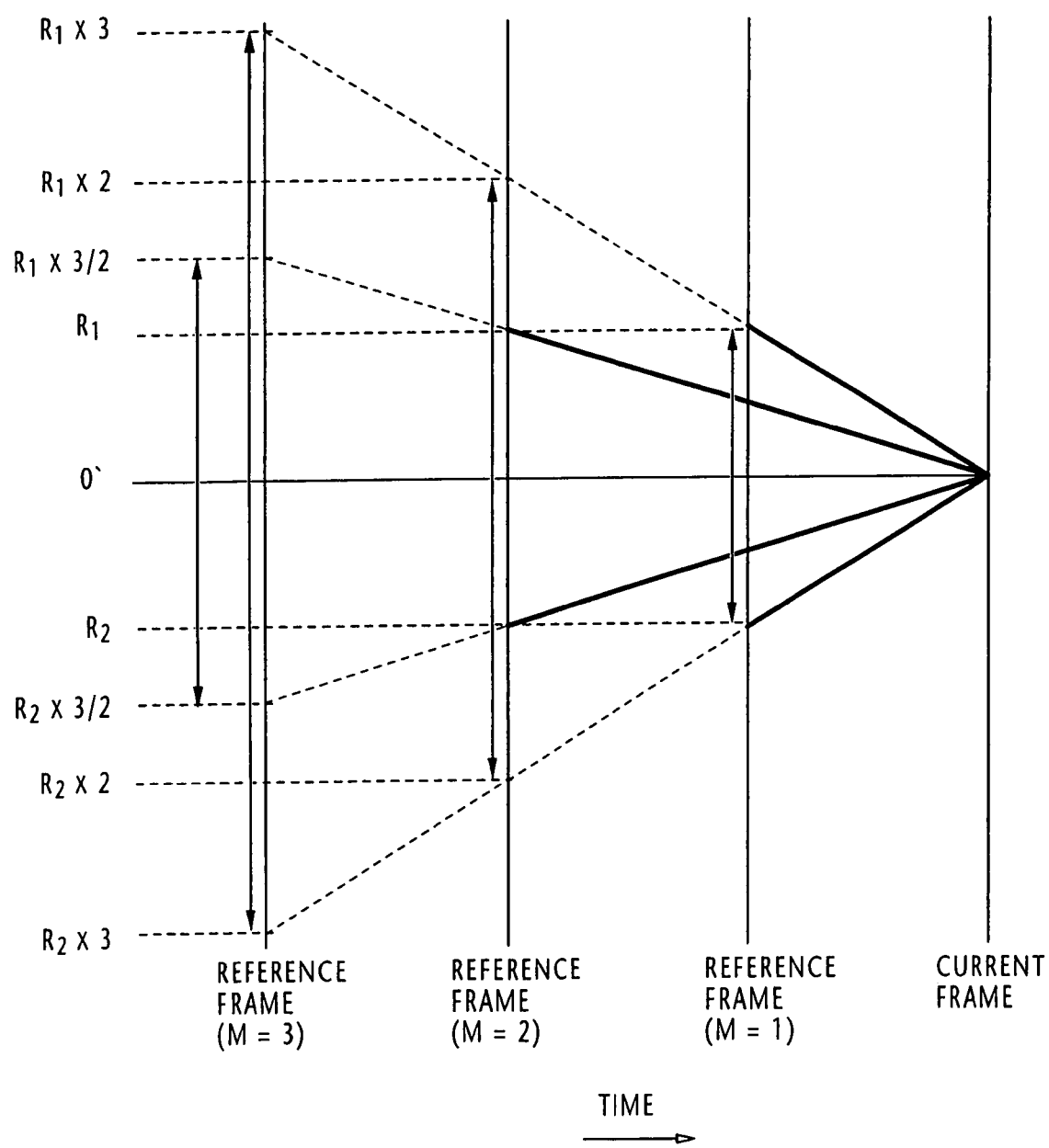

VIDEO CODING BY ADAPTIVELY CONTROLLING THE INTERVAL BETWEEN SUCCESSIVE PREDICTIVE-CODED FRAMES ACCORDING TO MAGNITUDE OF MOTION

BACKGROUND OF THE INVENTION

1. Field of the Invention

The present invention relates to a video coding apparatus and method for encoding moving pictures in a compressed format according to an international standard such as ISO/IEC 13818-2, known as MPEG-2.

2. Description of the Related Art

The MPEG-2 standard defines three picture types: intra-coded pictures (I-pictures), predictive coded pictures (P-pictures) and bi-directionally predicted pictures (B-pictures). I-pictures are coded in such a way that they can be decoded without knowing anything about other pictures in a video sequence. The first picture in a group of pictures is always an I-picture and provides key information for pictures that follow. P-pictures are coded (i.e., forward predictive coded) by using information from a reference picture displayed earlier, which may be either an I-picture or a P-picture. B-pictures also use information from pictures displayed earlier and from pictures coming in the future (i.e., forward-and-backward predictive coded). These three picture types cyclically occur in a predetermined pattern. According to the current practice, I-pictures occur at intervals represented by an integer N and the interval between an I-picture and a P-picture is represented by an integer M. Since these integers are of fixed value, the video sequence is dynamically controlled so that they are maintained constant.

As shown in FIG. 1A, when M=1, an I-picture is followed by a sequence of P-pictures. Each P-picture is coded by using information from a picture that immediately precedes it. For M=2 (FIG. 1B), the interval between an I-picture and a P-picture is equal to "2" and a B-picture comes in between. In this case, each P-picture is coded by using information from a picture preceding it by two-picture interval and each B-picture is coded using information from two pictures, one immediately preceding it and the other immediately succeeding it. For M=3 (FIG. 1C), the interval between an I-picture and a P-picture is equal to "3" and two B-pictures are used to fill in the interval. In this case, each P-picture is coded by using information from a picture preceding it by three-picture interval, and one of the two B-pictures is coded using information from an immediately preceding picture and from a future picture that comes two-picture intervals following it, and the other of the two B-pictures is coded using information from a previous picture that precedes it by two-picture intervals and from a picture immediately following it. Thus, for $M \geq 2$, the number of B-pictures that come in between non-B-pictures is equal to M−1.

One reason for using the B-picture is to reduce the amount of redundant video information inherently contained in the original frame. For a given quantization scale, the use of B-pictures can reduce the number of codes with which original pictures are encoded. Hence, the picture quality can be improved for a given compression (coding) rate. Another reason for using the B-picture is its tendency toward cancelling an accumulated error that will result from continued prediction coding processes that use information only from previous pictures of "parent generations" which themselves were predicted from reference pictures of "grandparent generations". Therefore, if unidirectional (forward) predictive coding were exclusively used, predictive coded "generations" would increase rapidly with time and quantization errors would accumulate significantly. B-pictures present a solution to this problem.

Although the B-picture provides a benefit, the use of many B-pictures (with the resultant increase in the M-value) is disadvantageous for fast-moving pictures since it becomes difficult to search for motion vectors within a range that is considered appropriate. Consider, for example, an object moving at a constant velocity. Since the amount of motions for each frame is constant, an increase in the M-value would cause the moving object to proportionally increase its range of motions. In order to precisely search for motion vectors, it would be necessary to perform a vector search over a wide range that is variable in proportion to the M-value.

One prior art approach involves setting a maximum value of per-frame motions and then determining a range of motion vectors to be searched for that is M times the maximum value. However, a significant amount of hardware is necessary to implement this approach. Although the hardware problem can be avoided by the use of an algorithm that simplifies motion vector search, this would be only achieved at the cost of search precision and a poor picture quality would result.

Another prior art approach is disclosed in Japanese Laid-Open Patent Application 9-294266. According to this technique, a distribution of motion vectors and a differential value of inter-frame predictions are detected. The M-value is increased according to the detected distribution and is decreased according to the detected differential value. Therefore, if a motion-vector search is being performed on a current P-picture using M=2 over a given range and most of the motion vectors are found to exist in that given range, then the M-value is incremented to 3 and a picture that is three frame intervals future from the current P-picture is determined as the next P-picture. Otherwise, the M value remains unchanged and a picture that is two frame intervals future from the current P-picture is determined as the next P-picture. If the detected differential value of inter-frame predictions exceeds some threshold, the M-value is decremented to 1 and a picture that is one frame interval future from the current P-picture is determined as the next P-picture. However, it is established that, in most cases, the distribution of motion vectors is isotropic about an average vector and its spread (variance) varies depending on the strength of auto-correlation of motions. Therefore, statistical data of motion vectors cannot be estimated by the number of motion vectors which exist in a search range and exceed a threshold value. If motion vectors have a large mean value in the neighborhood of a threshold within a given range that is considered sufficient for a search regardless of their variance, the narrowing of the search range would cause a significant degradation of picture quality. If the distribution of motion vectors is used for making a decision for the adequacy of the search range and if the algorithm for such decision is based solely on a motion vector distribution approaching a zero vector point, a decision is likely to be made in favor of the adequacy of the search range. When the distribution immediately moves away from the zero vector point, it can occur that the search range will be found to be insufficient. Therefore, several frames would be taken to readjust the interval between successive P-pictures. A delayed action will cause poor picture quality.

SUMMARY OF THE INVENTION

It is therefore an object of the present invention to provide a video coding apparatus and method (algorithm) for reducing hardware scale while enabling a wide range of motion vectors to be searched for.

In general terms, the video coding apparatus comprises coding/decoding circuitry for providing motion-compensated inter-frame prediction coding on input frames by using reference frames so that the input frames are coded into an intra-frame coded picture, a predictive coded picture or a bi-directionally predictive coded picture and decoding the coded frames to produce reference frames. Decision circuitry is provided for determining the magnitude of motion of the input frames relative to the reference frames, determining the interval between successive frames of the predictive coded pictures and reordering the input frames according to the determined interval.

In specific terms, the video coding apparatus of this invention comprises a first memory for storing a plurality of input frames, a second memory for storing reference frames, motion vector detection circuitry for detecting motion vectors in frames from said first memory relative to reference frames selectively supplied from said second memory according to a control signal, coding/decoding circuitry for providing motion-compensated inter-frame prediction and coding on a frame supplied from said first memory according to the detected motion vectors and said control signal so that the frame is coded into an intra-frame coded picture, a predictive coded picture or a bi-directionally predictive coded picture and locally decoding the coded frame and storing the decoded frame in said second memory as one of said reference frames, and mean value calculation circuitry for calculating, at frame intervals, a mean value of the detected motion vectors. Decision circuitry determines an interval between successive frames of said predictive coded picture according to the mean value, and modifies the control signal according to the determined interval.

According, to a further aspect, the present invention provides a video coding method comprising the steps of providing motion-compensated inter-frame prediction and coding on input frames by using reference frames so that the input frames are coded into an intra-frame coded picture, a predictive coded picture or a bi-directionally predictive coded picture, decoding the coded frames to produce the reference frames, determining the magnitude of motion of the input frames relative to the reference frames, determining the interval between successive frames of the predictive coded picture according to the determined magnitude of motion and reordering the input frames according to the determined interval.

BRIEF DESCRIPTION OF THE DRAWINGS

The present invention will be described in further detail with reference to the accompanying drawings, in which:

FIGS. 1A, 1B and 1C are illustrations of sequences of frames for different M-values according to the MPEG-2 standard;

FIG. 2 is a block diagram of a video coding apparatus according to one embodiment of the present invention;

FIG. 5 is a schematic illustration of the search ranges of the video coding apparatus;

DETAILED DESCRIPTION

Figure 3:
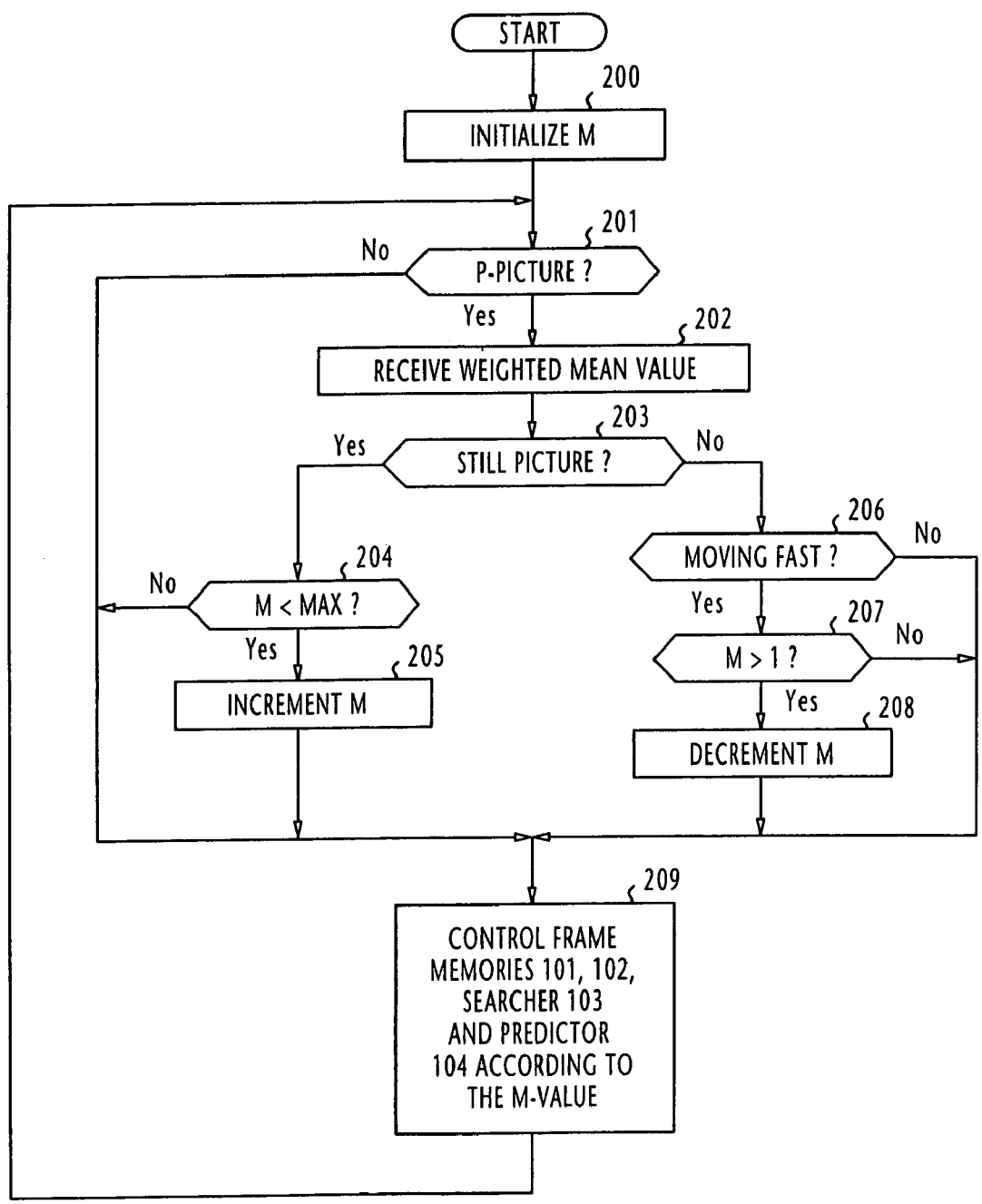
FIG. 3 is a flowchart of the operation of the GOP structure decision circuit according to one embodiment of the present invention.

Referring to FIG. 2, there is shown a video coding apparatus according to the present invention. The coding apparatus is comprised of an input frame memory 101 for receiving a plurality of video frames supplied from an input terminal 150 for storage and outputting frames in a coding order in which these output frames will be encoded. Each of the stored frames is divided into a plurality of regions or "macroblocks" and a coding process will be performed on each of the macroblocks. The reordering of the frames in the input frame memory 101 is controlled by a GOP structure decision circuit 110 which produces an M-value representing a GOP (group of pictures) structure. A differential signal representing the error between a predicted frame provided by an motion-compensated inter-frame predictor 104 and a frame supplied from memory 101 is produced by a subtractor 105. This prediction error is coded by an encoder 106 and supplied to an output terminal 151.

The output of encoder 106 is further connected to a decoder 107 to reconstruct the prediction error, which is combined in an adder 108 with the frame predicted by motion-compensated inter-frame predictor to produce locally decoded frames. The locally decoded frames are stored in a reference frame memory 102 as reference frames, which are then selected and delivered to the motion-compensated inter-frame predictor 104 and a motion vector searcher 103. The selection of the reference frames is determined by the GOP structure decision circuit 110.

Motion vector searcher 103 receives input frames from the input frame memory 101 and reference frames from the reference frame memory 102 and makes a search through a range of input frames determined by the GOP structure decision circuit 110 for detecting motion vectors. If the video signal is interlaced, the motion vector searcher 103 may be configured to make a search through each field of input frames. Alternatively, each field of the frame may be divided into a plurality of blocks of 16 pixels by 8 lines each. In this case, the motion vector search may be provided for each of these blocks.

Motion-compensated inter-frame predictor 104 uses a reference frame from the memory 102 to provide a motion-compensated inter-frame prediction on an input frame from the memory 101 in accordance with the output of the GOP structure decision circuit 110 and the output of the motion vector searcher 103, so that the input frame is coded by the encoder 106 as an I-picture, a P-picture or a B-picture depending on the M-value determined by the decision circuit 110. When intra-frame coding is performed, the motion-compensated inter-frame predictor 104 produces no output signal. In this case, a frame or a macroblock from the input frame memory 101 is passed through the subtractor 105 without alterations and supplied to the encoder 106.

A mean value calculator 109 is connected to the motion vector searcher 103 to calculate a mean value of motion vectors detected by the searcher 103 from each macroblock and produces an average motion vector for each macroblock. Since the motion vectors detected by the searcher 103 are vectors in the forward direction (from previous to current) as well as the backward (from future to current) direction, a weighted mean value is calculated using one motion vector in a macroblock.

In an alternative embodiment, the motion vector searcher 103 makes a decision as to whether intra-frame coding is appropriate during a search through macroblocks of the input frame. If this is the case, the motion vector searcher 103 provides no output to the mean value calculator 109.

The GOP structure decision circuit 110 is configured to produce a signal indicating whether the frame currently being encoded is an I-picture, a P-picture or a B-picture and supplies picture type indication to the motion vector searcher 103. The GOP structure decision circuit 110 proceeds to perform an M-value updating process according to the flowchart of FIG. 3.

The routine begins with initialization of the M-value at step 200. At decision step 201, the decision circuit 110 determines from the current M-value whether or not the current frame is a predictive coded picture (P-picture). If the decision is affirmative at step 201, the routine proceeds to step 202 to receive a weighted mean value from the mean value calculator 109 and determines, at step 203, whether or not the current frame is a still picture. If the current frame is a still picture, the routine proceeds to decision step 204 to determine if the current M-value is smaller than a predefined maximum value. If the current M-value is smaller than the maximum value, the decision circuit 110 increments M by a prescribed amount (step 205).

If the current frame is not a still picture, the routine proceeds from step 203 to decision step 206 to check to see if the current P-picture is a fast moving picture. If the current frame is a fast moving picture, the decision circuit 110 determines, at step 207, whether the current M-value is greater than 1. If M is greater than 1, the M-value is decremented by a prescribed value (step 208).

Following the execution of step 205 or 208, the decision circuit 110 proceeds to step 209 to control the frame memories 101, 102, the motion vector searcher 103 and the motion-compensated inter-frame predictor 104 according to the updated M-value, and then returns to step 201 to repeat the M-value updating process. At decision step 201 of each successive updating process, the decision circuit 110 determines the picture type from the M-value updated in a previous process.

If each of the decisions made at steps 201, 204, 206 and 207 is negative, the decision circuit 110 proceeds to step 209 to control the memories 101, 102, searcher 103 and predictor 104 according to the current M-value.

The starting value with which the M-value is initialized may be a maximum value. At steps 205 and 208, the M-value may be varied with a unit value of one.

Figure 4A:
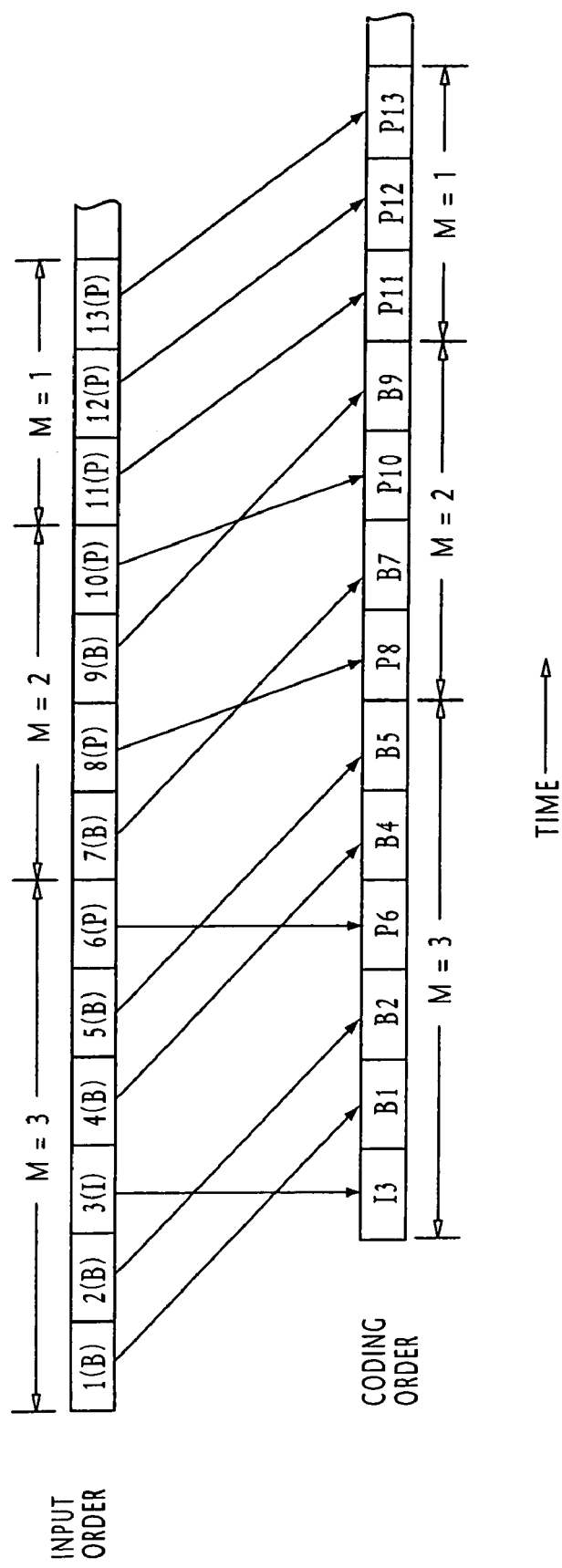
FIGS. 4A and 4B are diagrams for illustrating the relationships between input (display) order and coding order.
Figure 4B:
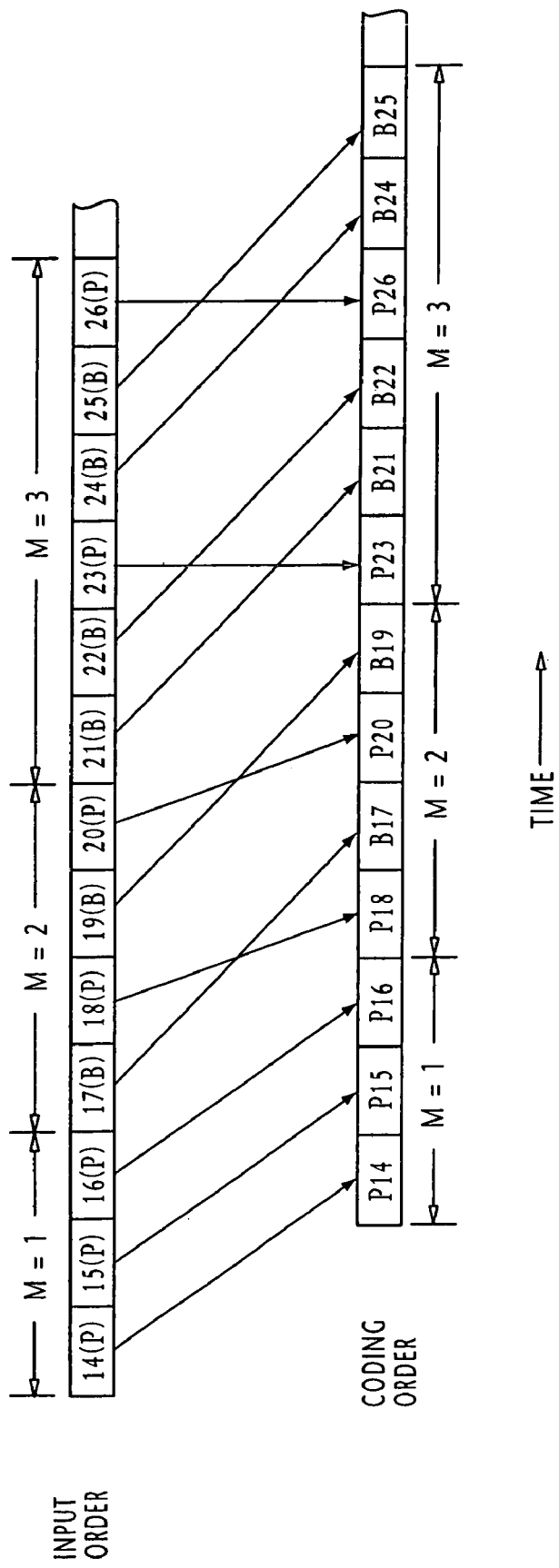

The updating process of the GOP structure decision circuit 110 will be visualized by the following description with reference to FIGS. 4A and 4B by assuming that the input memory 101 has the capacity of storing as many frames as necessary to provide reordering when the M-value is maximum.

In FIG. 4A, the M-value is successively decremented if the GOP structure decision circuit 110 determines that a current frame is a fast moving picture. If the initial M-value is 3, input frames are stored in the input frame memory 101 in the order 1(B), 2(B), 3(J), 4(B), 5(B) and 6(P) for a period necessary for reordering. These stored frames are reordered such that the third frame 3(I) comes first in the coding order so that it can be intra-frame coded as an I-picture I3. The I-picture I3 is followed by the first and second frames 1(B) and 2(B) so that they are coded as B-pictures B1 and B2. The sixth frame 6(P) comes in the fourth position so that it can be coded as a P-picture P6. The P-picture P6 is followed by the fourth and fifth frames 4(B) and 5(B), which will be coded as B-pictures B4 and B5. When the M-value is decremented to "2", subsequent input frames are stored in the frame memory 101 in the order 7(B), 8(P), 9(B) and 10(P) for a period necessary for reordering. Since the frame 8(P) must precede the frame 7(B), these frames are reordered and coded as a P-picture PS and a B-picture B7. Likewise, since the frame 10(P) must precede the frame 9(B), these frames are reordered and coded as a P-picture P10 and a B-picture B9. When the M-value is further decremented to "1", subsequent frames are stored in the frame memory 101 in the order 11(P), 12(P) and 13(P). In the illustrated example, since the output frames are delayed by two frames with respect to the input frames, input frames 11(P), 12(P) and 13(P) are stored for a two-frame interval and delivered without being reordered and encoded into P-pictures P11, P12 and P13.

In FIG. 4B, the M-value is successively incremented if the GOP structure decision circuit 110 determines that a current frame is a still picture, starting from M=1 in which input frames are stored in the frame memory 101 in the order 14(P), 15(P) and 16(P) for a two-frame interval and delivered without being reordered and encoded as frames P14, P15 and P16, When the M-value is incremented to "2", frames 17(B) and 18(P) are reversed in order, and frames 19(B) and 20(P) are reversed in order and delivered as P18, B17, P20 and B19. When the M-value is incremented to "3", frame 23(P) comes earlier than frames 21(B) and 22(B), and frame 26(P) comes earlier than frames 24(B) and 25(B). All of these frames are delivered as P23, B21, B22, P26, B24 and B25.

FIG. 5 schematically illustrates search ranges of the motion vector searcher 103 for different M-values in a one-dimensional scale (note that the actual search ranges are two-dimensional). Assume that the motion vector searcher 103 is making a search in a given direction in the range between $R_1$ and $R_2$. Consider the relationships between a current frame and reference frames (P-pictures) with M=1, 2 and 3. As shown in FIG. 5, when the searcher 103 is making a search with M=1, the increment of frame interval by one frame will enlarge the search range by a factor of 2 and the increment of frame interval by two frames will enlarge the range by a factor of 3. Likewise, when the searcher 103 is making a search with M=2, the increment of frame interval by one frame will enlarge the search range by a factor of 3/2. In this way, when there is a fast moving object the searcher 103 can keep track of its motion vectors.

When fast moving objects are detected and hence it is difficult to perform a wide-range vector search, the GOP structure decision circuit 110 decrements the M-value to shorten the frame interval between P-pictures so that the performance of the motion-compensated inter-frame predictor 104 is increased. In contrast, when still pictures are detected and hence it is not necessary to perform a wide-range vector search, the GOP structure decision circuit 110 increments the M-value to lengthen the frame interval between P-pictures to increase intervening B-pictures so that the overall coding efficiency of the apparatus is improved.

Figure 6:
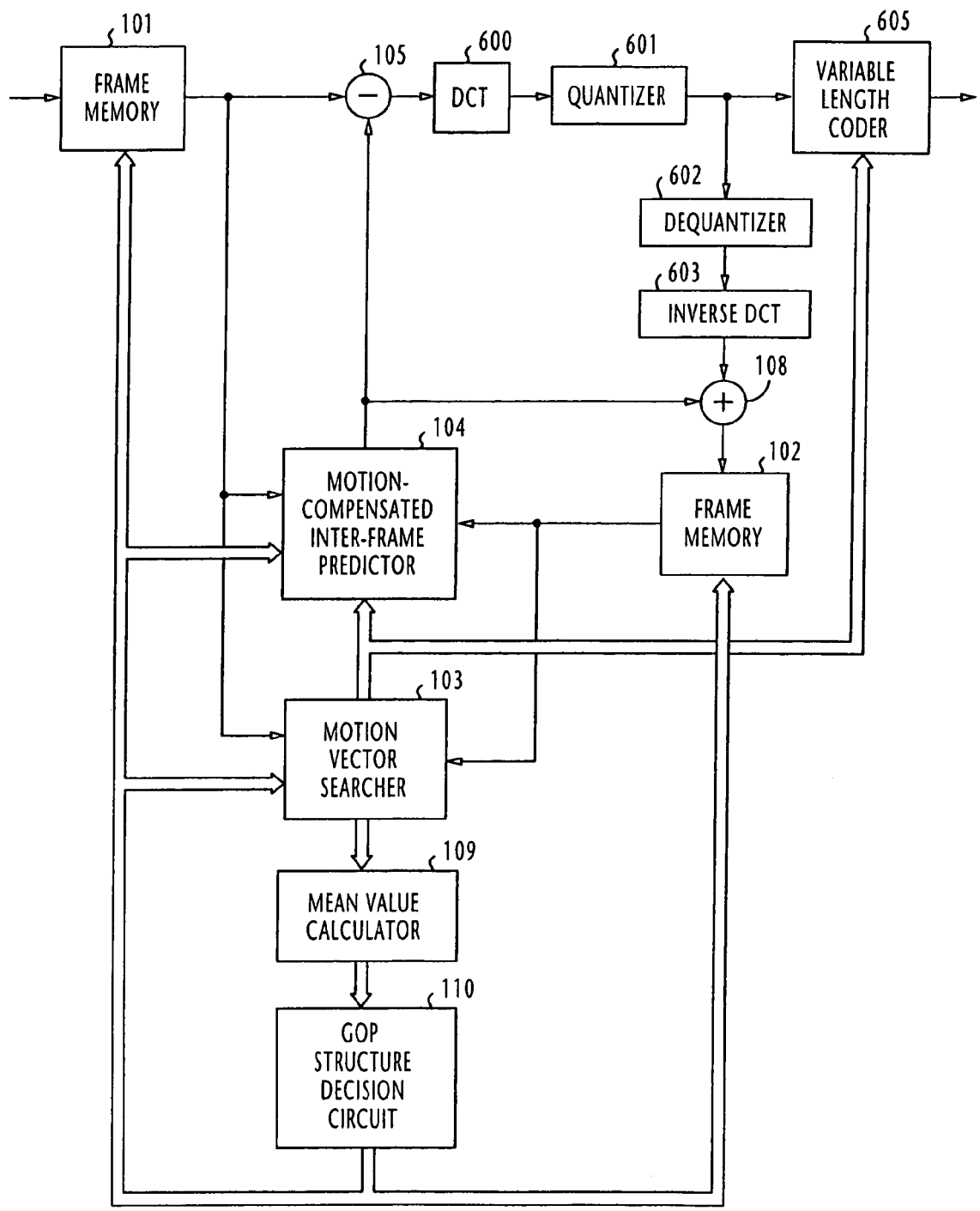
FIG. 6 is a block diagram of a practical form of the video coding apparatus of the present invention.

FIG. 6 shows a practical form of the video coding apparatus of the present invention in which parts corresponding in significance to those of FIG. 2 are marked with the same numerals and the description thereof is omitted for simplicity. The encoder of FIG. 2 is replaced with a DCT (discrete cosine transform) coder 600 and a quantizer 601 and the decoder is replaced with a dequantizer 602 and an inverse DCT circuit 603. DCT coefficient data is quantized by the quantizer 601 and supplied to a variable length coder 605 as well as to the dequantizer 602. Variable length coder 605 performs run-length coding on the quantized DCT coefficient by using the motion vector supplied from the motion vector searcher 103.

Figure 7:
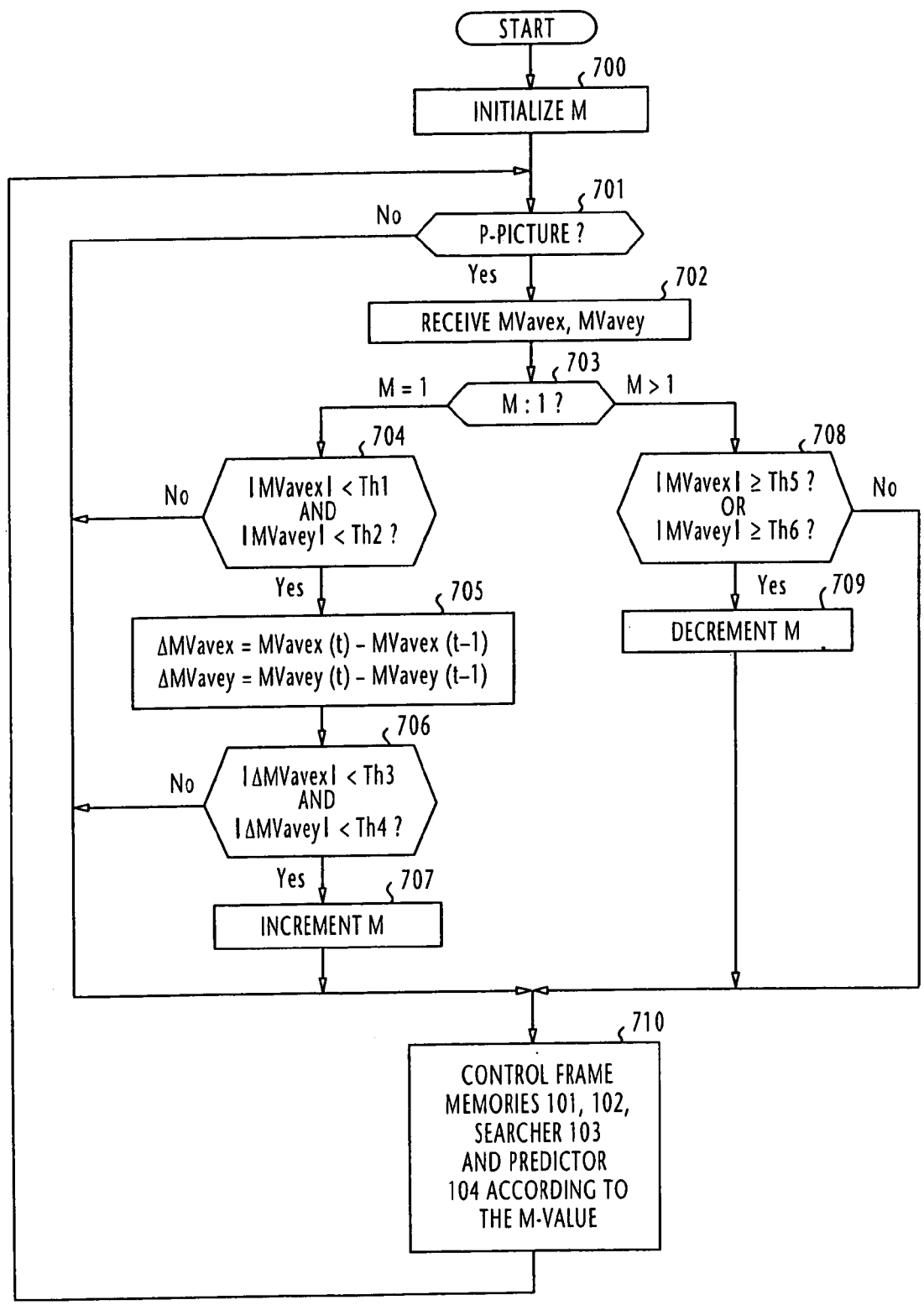
FIG. 7 is a flowchart of the operation of the GOP structure 18 decision circuit according to a modified embodiment of the present invention.

The flowchart shown in FIG. 7 is used to operate the GOP structure decision circuit of FIG. 6. The M-value is first initialised at step 700 and the picture type is determined at step 701 from the M-value. If a P-picture is detected, the GOP structure decision circuit 110 proceeds to step 702 to receive a mean value of horizontal motion vectors (MVavex) and a mean value of vertical motion vectors (MVavey) from the mean value calculator 109. At step 703, the decision circuit 110 compares the M-value with a reference value "1". If M=1, flow proceeds to step 704 to check to see if the following conditions are simultaneously met:

|MVavex| is smaller than a threshold value $Th1$; and

|MVavey| is smaller than a threshold value $Th2$.

If the above-mentioned conditions are met, the decision circuit 110 proceeds to step 705 to calculate the rate of change of horizontal average motion vector ($\Delta$MVavex) and the rate of change of vertical average motion vector ($\Delta$MVavey) as follows.

$$\Delta MVavex = MVavex(t) - MVavex(t-1)$$

$$\Delta MVavey = MVavey(t) - MVavey(t-1)$$

where t represents the frame number.

GOP structure decision circuit 110 proceeds to step 706 to determine whether the following conditions are simultaneously satisfied;

|$\Delta$MVavex| is smaller than threshold $Th3$; and

|$\Delta$MVavey| is smaller than threshold $Th4$.

If these conditions are simultaneously met, flow proceeds to step 707 to increment the M-value by a predetermined amount.

If M is greater than 1, the decision circuit 110 proceeds from step 703 to step 708 to determine if one of the following conditions is met:

|MVavex| is equal to or greater than a threshold value $Th5$; or

|MVavey| is equal to or greater than a threshold value $Th6$.

If the decision at step 708 is affirmative, flow proceeds to step 709 to decrement the M-value by a predetermined amount. At step 710, the decision circuit 110 controls the frame memories 101, 102, the motion vector searcher 103 and the motion-compensated inter-frame predictor 104 according to the updated M-value, and then returns to step 701 to repeat the M-value updating process.

If each of the decisions made at steps 701, 704, 706 and 708 is negative, the decision circuit 110 proceeds to step 710 to control the memories 101, 102, searcher 103 and predictor 104 according to the current M-value.

Figure 8:
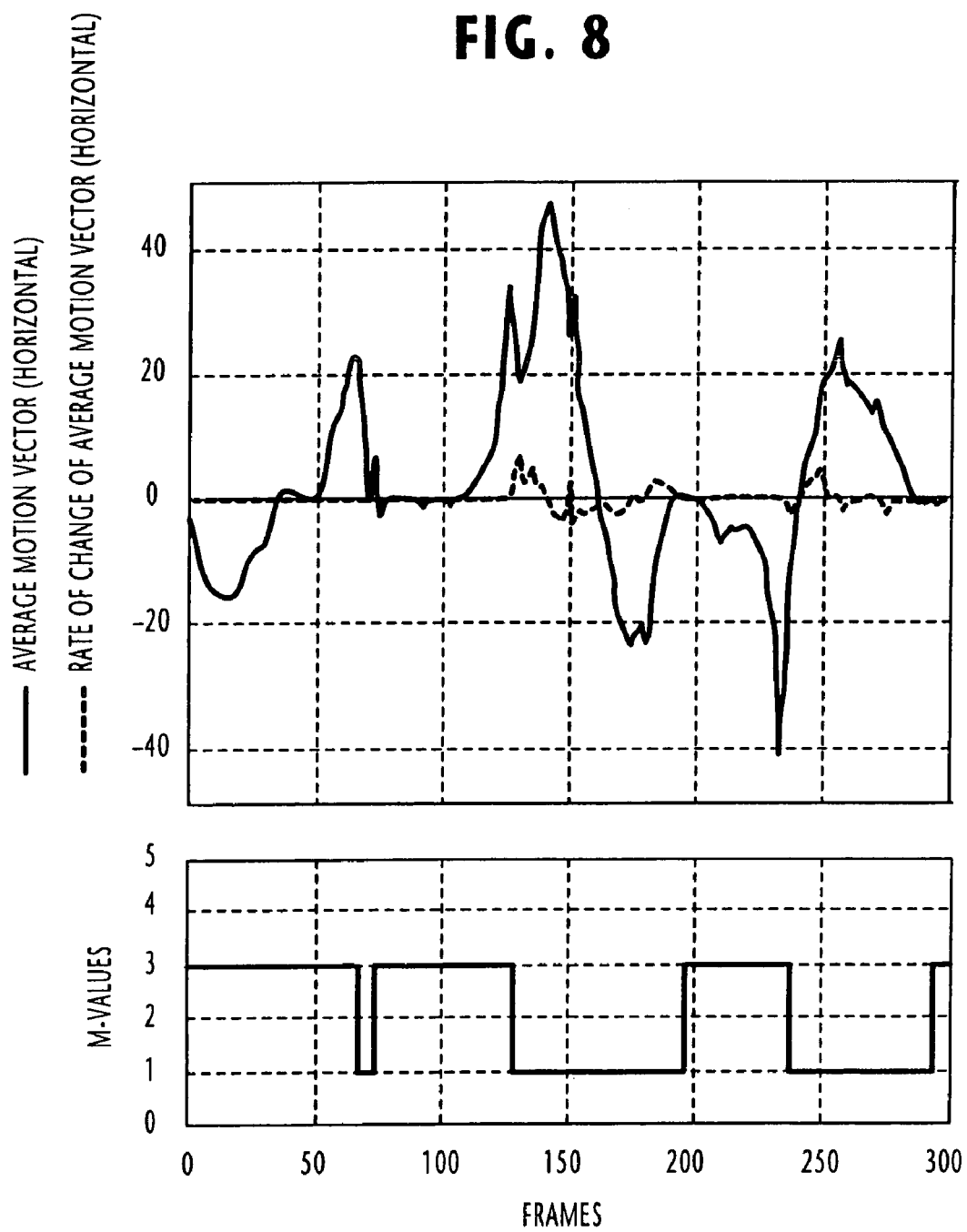
FIG. 8 is a graphic representation of average motion vector, rate of change of average motion vector and an M-value plotted versus frames.

In order to evaluate the performance of the video coding apparatus, fast moving pictures were experimentally used as input frames and the incremental unit of steps 707 and 709 was set equal to 2 so that the M-value is switched between 1 and 3 when each of the decisions at steps 706 and 708 is affirmative. Results of the experiment are shown in FIG. 8, in which the horizontal average motion vector, the rate of change of the horizontal average motion vector and the corresponding M-value are plotted as a function of the number of frames. It is seen that when a fast moving picture is detected, the M-value is reset to 1. Since the time-varying rate of motion vectors is taken into account by steps 705 and 706, the M-value is maintained at 1 when the number of frames is 170, where the average motion vector is crossing the zero level. In this way, the updating performance of the M-value is optimized.

The average motion vectors MVavex and MVavey used by the GOP structure decision circuit 110 could be altered in a number of ways. By designating such vectors as |MV|, either one of the following conversions can be used:

$$|MV| = |MVavex| + |MVavey|$$

$$|MV| = MVavex^2 + MVavey^2$$

$$|MV| = \text{Square root of } (MVavex^2 + MVavey^2)$$

$$|MV| = a \star |MVavex| + b \star |MVavey|$$

$$|MV|\star = \text{Square root of } (a \star MVavex^2 + b \star MVavey^2)$$

where a and b are constants.

What is claimed is:

1. A video coding apparatus comprising:
coding/decoding circuitry for providing motion-compensated inter-frame prediction coding on input frames by using reference frames so that the input frames are coded into an intra-frame coded picture, a predictive coded picture or a bi-directionally predictive coded picture and decoding said coded frames to produce said reference frames; and
decision circuitry for determining a magnitude of motion of said input frames relative to said reference frames and a time-varying rate of change of said magnitude of motion derived from said magnitude of motion, determining an interval between successive frames of said predictive coded picture so that the determined interval varies inversely with the determined magnitude of motion and the determined time-varying rate of change of said magnitude, and reordering said input frames following said intra-frame coded picture according to the determined interval.

2. A video coding apparatus as claimed in claim 1, wherein said decision circuitry is configured to increment said interval when said magnitude of motion and said time-varying rate of said magnitude are simultaneously smaller than respective thresholds and to decrement said interval when said magnitude of motion is greater than a threshold.

3. A video coding apparatus comprising:
a first memory for storing a plurality of input frames;
a second memory for storing reference frames;
motion vector detection circuitry for detecting motion vectors in frames supplied from said first memory relative to reference frames selectively supplied from said second memory according to a control signal;
coding/decoding circuitry for providing motion-compensated inter-frame prediction and coding on a frame supplied from said first memory according to the detected motion vectors and said control signal so that the frame is coded into an intra-frame coded picture, a predictive coded picture or a bi-directionally predictive coded picture and locally decoding the coded frame and storing the decoded frame in said second memory as one of said reference frames;

mean value calculation circuitry for calculating, at frame intervals, a mean value of the detected motion vectors; and decision circuitry for calculating a time-varying rate of change of said mean value and determining an interval between successive frames of said predictive coded picture so that the determined interval varies inversely with the calculated mean value and the calculated time-varying rate of change of said mean value, and modifying said control signal according to the determined interval so that said input frames following the intra-frame coded picture are reordered.

4. A video coding apparatus as claimed in claim 3, wherein said decision circuitry is configured to increment said interval when said mean value and said time-varying rate are simultaneously smaller than respective thresholds and to decrement said interval when said mean value is greater than a threshold.

5. A video coding apparatus as claimed in claim 4, wherein said mean value comprises a horizontal component and a vertical component and wherein said decision circuitry is configured to increment said interval when said horizontal and vertical components are simultaneously smaller than respective thresholds and decrement said interval when one of said horizontal and vertical components is greater than a threshold.

6. A video coding apparatus as claimed in claim 3, wherein said mean value comprises a horizontal component and a vertical component and wherein said decision circuitry is configured to determine, as said time-varying rate, a difference between successive ones of said mean value of horizontal component and a difference in a vertical direction between successive ones' of said mean value of vertical component and increment said interval when said differences are simultaneously smaller than respective thresholds.

7. A video coding apparatus as claimed in claim 3, wherein said coding/decoding circuitry comprises:

motion-compensated inter-frame prediction circuitry for performing motion-compensated inter-frame prediction on an input frame supplied from said first memory according to the detected motion vectors and to a control signal applied thereto;

subtraction circuitry for producing a differential frame from a frame supplied from the first memory and an output signal of said prediction circuitry;

encoding circuitry for coding said differential frame so that said input frame is coded into an intra-frame coded picture, a predictive coded picture or a bi-directionally predictive coded picture;

decoding circuitry for decoding the coded differential frame; and summing circuitry for producing a combined frame from the decoded differential frame and the output of signal of said prediction circuitry and storing the combined frame into said second memory.

8. A video coding apparatus as claimed in claim 7, wherein said encoding circuitry comprises a discrete cosine transform (DCT) coder for transforming said differential frame to DCT coefficients, a quantizer for quantizing the DCT coefficients, and a variable length coder for transforming the quantized coefficients and the motion vector detected by said motion vector detection circuitry to run-length codes, and wherein said decoding circuitry comprises a dequantizer for dequantizing the quantized differential frame and a DCT decoder for decoding the dequantized differential frame.

9. A video coding method comprising the steps of:

a) providing motion-compensated inter-frame prediction and coding on input frames by using a reference frame so that the input frames are coded into an intra-frame coded picture, a predictive coded picture or a bi-directionally predictive coded picture;

b) locally decoding said coded frames to produce said reference frames;

c) determining a magnitude of motion of said input frames relative to said reference frames and a time-varying rate of change of said magnitude of motion derived from said magnitude of motion;

d) determining an interval between successive frames of said predictive coded picture so that the determined interval varies inversely with the determined magnitude of motion and said time-varying rate of change of said magnitude; and e) reordering said input frames following said intra-frame coded picture according to the determined interval.

10. A video coding method as claimed in claim 9, wherein the step (c) comprises the steps of detecting motion vectors in said input frames relative to said reference frames and calculating, at frame intervals, a mean value of the detected motion vectors to represent said magnitude of motion and said time-varying rate of change of said mean value.

11. A video coding method as claimed in claim 10, wherein the step (d) comprises the step of incrementing said interval when said mean value and said time-varying rate of change of the mean value are simultaneously smaller than respective thresholds and decrementing said interval when said mean value is greater than a threshold.

12. A video coding method as claimed in claim 10, wherein said mean value comprises a horizontal component and a vertical component.

13. A video coding method as claimed in claim 10, wherein said mean value comprises a horizontal component and a vertical component and wherein the step (d) comprises the steps of determining, as said time-7 varying rate, a difference between successive ones of said mean value of horizontal component and a difference in a vertical direction between successive ones of said mean value of vertical component and incrementing said interval when said differences are simultaneously smaller than respective thresholds.

* * * * *